US008896871B2

(12) United States Patent
Pangrazio, III et al.

(10) Patent No.: US 8,896,871 B2
(45) Date of Patent: Nov. 25, 2014

(54) BATCH CONFIRMATION OF DISTRIBUTED SCAN JOB SUBMISSION IN A BUSINESS PROCESSING SYSTEM

(71) Applicant: XEROX Corporation, Norwalk, CT (US)

(72) Inventors: Donald M. Pangrazio, III, LeRoy, NY (US); John A. Moore, Victor, NY (US)

(73) Assignee: XEROX Corporation, Norwalk, CT (US)

( * ) Notice: Subject to any disclaimer, the term of this patent is extended or adjusted under 35 U.S.C. 154(b) by 97 days.

(21) Appl. No.: 13/799,094

(22) Filed: Mar. 13, 2013

(65) Prior Publication Data

US 2014/0268212 A1 Sep. 18, 2014

(51) Int. Cl.
*G06F 15/00* (2006.01)
*H04N 1/00* (2006.01)
*H04N 1/04* (2006.01)

(52) U.S. Cl.
CPC .................................. *H04N 1/00037* (2013.01)
USPC ............ 358/1.15; 358/1.6; 358/400; 358/494

(58) Field of Classification Search
USPC ......... 358/1.15, 1.6, 400, 474, 501, 505, 450, 358/540, 407, 442, 468, 440, 402, 405, 435, 358/436, 438, 439, 443, 447, 448; 709/206, 709/245, 217, 238; 379/1.03, 100.06, 379/100.08, 93.24, 100.01, 100.12, 93.31, 379/90.01, 88.13, 88.12, 88.17
See application file for complete search history.

(56) References Cited

U.S. PATENT DOCUMENTS

| 5,377,017 | A | * | 12/1994 | Lam .............................. 358/405 |
| 6,032,004 | A | | 2/2000 | Mirabella, Jr. et al. |
| 6,477,243 | B1 | * | 11/2002 | Choksi et al. ............ 379/100.06 |
| 6,487,611 | B1 | | 11/2002 | Brusky et al. |
| 7,107,283 | B2 | | 9/2006 | Seifi |
| 7,562,223 | B2 | | 7/2009 | Ragnet et al. |
| 2006/0072144 | A1 | * | 4/2006 | Dowling et al. ............. 358/1.15 |
| 2006/0087688 | A1 | | 4/2006 | Itogawa |
| 2006/0256392 | A1 | | 11/2006 | Van Hoof et al. |
| 2006/0268362 | A1 | * | 11/2006 | Bridges et al. ................ 358/450 |
| 2007/0253015 | A1 | | 11/2007 | Eguchi et al. |

* cited by examiner

*Primary Examiner* — Ngon Nguyen
(74) *Attorney, Agent, or Firm* — Gibb & Riley, LLC

(57) ABSTRACT

Methods and systems execute a first scan job using a scanner device to produce a first electronic scan item, and automatically transmit the first electronic scan item from the scanner device to a computerized device over a network. Exemplary methods herein start execution of a second scan job immediately after executing the first scan job (without waiting for confirmation that the computerized device received the first scan job) using the scanner device to produce a second electronic scan item. Further, such methods automatically generate a first scan receipt confirmation using the computerized device and automatically transmit the first scan receipt confirmation from the computerized device to at least one receiving device (e.g., the scanner device) over the network. Such exemplary methods can therefore automatically display the first scan receipt confirmation (on a graphic user interface of the at least one receiving device) after starting execution of the second scan job.

24 Claims, 4 Drawing Sheets

BATCH CONFIRMATION OF DISTRIBUTED SCAN JOB SUBMISSION IN A BUSINESS PROCESSING SYSTEM

BACKGROUND

Systems and methods herein generally relate to systems and methods that perform distributed scan jobs, and to such systems and methods that perform batch scanning and provide confirmation of scan job transmissions.

Multi-function printing devices (MFDs—devices that can print, scan, fax, transmit, etc.) can be customized to meet customers' needs. In many cases, scan job delivery confirmation is not crucial to a walk-up user that is capturing a document or two. However, with some applications such as business process outsourcing (BPO), MFDs are used in a production-like setting, where users may be scanning jobs at the MFD for hours at a time, and where scan delivery confirmation is important to the workflow. Conventional systems require the user to wait for the transmission of the scan job to be complete in order to receive a confirmation number (adding a significant overhead to the capture cycle, especially for cloud based servers).

Scan delivery confirmation information is used in workflows that require quick turnaround, archival of hardcopy, the ability to identifying the job for on-line follow-up, proofing and approval to the next workflow step, etc. Waiting for scan delivery confirmation information is especially time consuming for large high resolution or color scan jobs, batch scanning where documents are separated via cover sheets, scanning direct to a cloud/hosted server where network speed is not as fast as delivering locally, etc.

SUMMARY

Exemplary methods herein execute a first scan job using a scanner device to produce a first electronic scan item, and automatically transmit the first electronic scan item from the scanner device to a computerized device over a network (that is operatively connected to the computerized device and the scanner device). Such methods herein then start execution of one or more second scan jobs (e.g., N subsequent scan jobs) immediately after executing the first scan job (without waiting for confirmation that the computerized device received the first scan job) using the scanner device to produce a second electronic scan item. Further, such methods automatically generate a first scan receipt confirmation using the computerized device (based on the computerized device receiving the first electronic scan item from the scanner device) and automatically transmit the first scan receipt confirmation from the computerized device to at least one receiving device over the network, in some cases after the second scan job has been started. The execution of the second scan job and the transmitting of the first electronic scan item can be performed simultaneously. The "receiving device" referred to above can be the scanner device itself and/or additional computerized device(s) separate from the scanner device, such as a smart phone, personal computer, etc.

The scanner device and the computerized device are therefore elements of a system, and such a system can require the scanner device to always provide immediate automatic electronic transmissions of the scan jobs to the computerized device based on the scanner device executing the scan jobs. By "immediate automatic" what is meant here is that the scanner device provides the electronic transmission as the very next processing step following completion of the scanning process, and that no intervening steps are present that would delay the scanner device from performing the transmission of the scan job, and no additional user action is required to have the electronic transmission occur. Similarly, the system can require the computerized device to always provide immediate automatic corresponding receipt confirmations of the scan jobs based on the computerized device receiving the scan jobs. Correspondingly, by "immediate automatic" what is meant is that the computerized device provides the receipt confirmation as the very next processing step following generation of the receipt confirmation, and that no intervening steps are present that would delay the computerized device from providing the receipt confirmation, and no additional user action is required to provide the receipt confirmation.

Such exemplary methods can therefore automatically display the first scan receipt confirmation (on a graphic user interface of the receiving device) after starting execution of the second scan job. In other words, the scanner device does not delay starting execution of the second scan job while waiting for the first scan receipt confirmation (prevents any delay that would that would be based on waiting for receipt of the first scan receipt confirmation). Similarly, if the first scan job is a multi-part scan job (where the first scan receipt confirmation would include multiple first scan receipt confirmations, and each of the multiple first scan receipt confirmations would relate to an individual part of the multi-part scan job); the exemplary methods herein prevent delay of continuation of any individual part of the multi-part scan job that would be based on waiting for receipt of any of the first scan receipt confirmations, and prevent delay of starting execution of the second scan job that would be based on waiting for receipt of the first scan receipt confirmation.

Exemplary systems herein are described using language similar to that presented above. Such exemplary systems can include (but are not limited to) at least one scanner device, at least one computerized device operatively connected to the scanner device over a network, at least one receiving device, etc. The network is operatively connected to (meaning directly or indirectly connected to) the computerized device and the scanner device. Again, the "receiving device" referred to above can be the scanner device itself and/or additional computerized device(s) separate from the scanner device, such as a smart phone, personal computer, etc.

As noted above, such exemplary systems herein can require the scanner device to always provide immediate automatic electronic transmissions of the scan jobs to the computerized device based on the scanner device executing the scan jobs. Similarly, the system can require the computerized device to always provide immediate automatic corresponding receipt confirmations of the scan jobs based on the computerized device receiving the scan jobs. Again, by "immediate automatic" execution of processing steps, what is meant is that the very next processing step following completion of the previous processing step is performed without pause, and that no intervening steps are present that would delay the next processing step, and no additional user action is required to have the next processing step occur.

With such exemplary systems, the scanner device executes a first scan job to produce a first electronic scan item, and automatically transmits the first electronic scan item to the computerized device. The scanner device then starts execution of a second scan job after the executing of the first scan job to produce a second electronic scan item. The computerized device automatically generates a first scan receipt confirmation based on the computerized device receiving the first electronic scan item from the scanner device, and automatically transmits the first scan receipt confirmation to the receiving device over the network. The receiving device then automatically displays the first scan receipt confirmation on a graphic user interface of the receiving device, even after starting execution of the second scan job.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
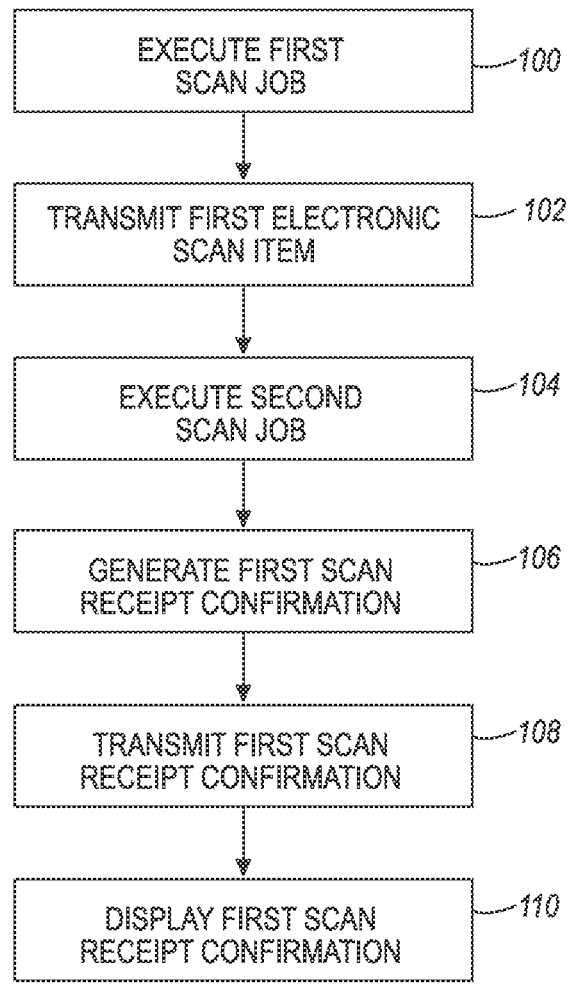
FIG. 1 is a flow diagram of various methods herein.

As mentioned above, scan delivery confirmation information is used in workflows; however, waiting for scan delivery confirmation information is especially time consuming. Therefore, the systems and methods herein provide configurable distributed scan delivery confirmation capabilities, without waiting at the device after each scan job. The systems and method herein provide a streamline capture workflow at the device, while at the same time provide the user with the delivery confirmation level that they require. Confirmation information that a user requires will depend on the document capture/archive/delete workflow process, so the information returned will be configurable. With systems and method herein confirmation will not block the user from starting another scan job because the confirmation is asynchronous in nature. Systems and method herein also do not tie the user to a particular device or require the user to return back to a workstation to check for confirmation because the confirmation can be received at a mobile device or the next MFD the user logs into.

With systems and method herein, scan delivery confirmation can be configured to be many different things to satisfy many different use cases. For example, configurations and information available for scan delivery confirmations include time based confirmations: accumulated confirmations (multi-job summaries for a given time period or shift); instant confirmations (confirmations as soon as available); intervals (confirmation summaries at a configured interval); etc. Further, scan delivery confirmations include job-based confirmations: per job (one confirmation per job); per document (multi-document jobs with cover separators will result in a confirmation per document); etc. Also, scan delivery confirmations include question/answer (QA) based confirmations which includes: number of images per document; scan capture settings; metadata fields; links to images for proofing; etc. Additionally, scan delivery confirmations include success/failure based confirmations: confirmation when certain failures occur, including transmission, document pre-flighting, missing meta data fields that are required, wrong number of expected images, etc.; confirmation on success; confirmation per stage of success; etc. Scan delivery confirmations further include document/form and pre-flighting based confirmations (based on zonal optical character recognition (OCR), required fields, selections made): confirmation with status on all required fields, signatures, etc.; document type confirmation (where the workflow or menu options selected on the device local user-interface (UI) defines the type of document being scanned); etc.

Thus, the systems and methods herein can provide accumulated scan-receipt confirmations at user set intervals. For example, the systems and methods herein can provide a receipt confirmation summary at the end of a specific work shift, or at the end of a prescribed time period (e.g., every hour, every day, etc.). Providing accumulated scan-receipt confirmations is a strong feature. With asynchronous processing and use of remote handheld devices, the accumulated receipt is highly useful.

Further, with systems and methods, different notifications (individual or accumulated notifications) can be sent at different stages of scan processing. Such different stages of scan processing can include, for example: when the scan file is received by the central processing computer; when the metadata in the file is checked, when an optical character recognition is successfully performed on the scan file, when all processing is complete and the originals can be destroyed, etc.

In addition, the various scan processing notifications (ranging from a single scan confirmation receipt to an accumulated summary of scan activity) can be provided to devices other than the device that was used to perform the scan, such as a smart phone, portable digital assistant (PDA), desktop or laptop computer, etc. Further, such scan processing notifications can be provided each time a user logs into another network-connected scan device (that may be different than the device on which the scanning was performed). For example, if an employee performs scans in the morning on one network-connected machine and then logs onto a different network-connected scanning device after lunch; at their post-lunch login, the employee can be provided with a summary of the processing/receipt of that morning's scans from the different scanning device used in the afternoon.

In another example, confirmation status can be received at the user's mobile device, such as a smart phone, computerized tablet, laptop computer, etc. (or next MFD logged into). For example, accumulated or multi-job summaries for a given time period or work shift are output to provide only the information required in a timely and summarized manner. On the other hand, for those users who require all the job details, a user of systems and methods can select an instant, per document delivery confirmation status within a multi-document job, if the workflow demanded. Lastly, a user logging into the same or different MFD can be provided the delivery confirmation status of all jobs since their last login and possibly job details.

The scan delivery confirmation can be configured with systems and methods herein to be sent to a mobile device, text message, email, instant messaging (IM), etc. Also, scan confirmations can be configurable with systems and methods herein to include information such as date/time, MFP identification, number of images (pages), document type (where workflow and menus selected define the document type), metadata fields (such as a document name), preflight results, etc.

With systems and methods herein, the scan delivery confirmation is asynchronous in nature, freeing the user from waiting at the device. For example, systems and methods herein can display scan job receipt confirmation at any networked device the user happens to login to next, or it can be received on the user's mobile device. Further, the scan delivery confirmations can be configured to be accumulated (or summarized) by content, time, job, event/status, etc. The systems and methods herein allow scan delivery confirmation to be configured to satisfy different goals for many different use cases.

FIG. 1 is flowchart illustrating exemplary methods herein. In item 100, these methods execute a first scan job using a scanner device to produce a first electronic scan item. A scan job is executed when one or more sheets are automatically or manually loaded into an optical scanner (which can include a document feeder or handler). Each sheet is scanned, and an electronic image of the sheets is captured and stored to become the first electronic item. The first electronic item can be a batch of different documents, or can be a single document (each document comprising one or more individual sheets or pages). While the systems and method herein support batch scanning if desired, the confirmations herein are highly useful when scanning one job at a time. In fact, when performing batch scanning with systems and methods herein, it is useful to receive per job status within the batch, in other words, breaking down the batch scan.

In item 102, such methods automatically transmit the first electronic scan item from the scanner device to a computerized device over a network (that is operatively connected to the computerized device and the scanner device). Such methods herein then start execution of a second scan job immediately after executing the first scan job (without waiting for confirmation that the computerized device received the first scan job) in item 104 using the scanner device to produce a second electronic scan item.

Further, in item 106, such methods automatically generate a first scan receipt confirmation using the computerized device (based on the computerized device receiving the first electronic scan item from the scanner device) and automatically transmit the first scan receipt confirmation from the computerized device to at least one receiving device over the network in item 108 (in some cases after the second scan job has been started, if the second scan job is started immediately after the first scan job). The execution of the second scan job in item 104, and the transmitting of the first electronic scan item in item 106 can be performed simultaneously. The "receiving device" referred to above can be the scanner device itself and/or additional computerized device(s) separate from the scanner device, such as a smart phone, personal computer, etc.

The scanner device and the computerized device are therefore elements of a specialized system for performing business process application workflows. Such a system can require the scanner device to always provide immediate automatic electronic transmissions of the scan jobs to the computerized device based on the scanner device executing the scan jobs. Similarly, the system can require the computerized device to always provide immediate automatic corresponding receipt confirmations of the scan jobs based on the computerized device receiving the scan jobs.

By "immediate automatic" execution of processing steps, what is meant is that the very next processing step following completion of the previous processing step is performed without pause, and that no intervening steps are present that would delay the next processing step, and no additional user action is required to have the next processing step occur. Therefore, in these examples, "immediate automatic" means that the scanner device provides the electronic transmission as the very next processing step following completion of the scanning process, and that no intervening steps are present that would delay the scanner device from performing the transmission of the scan job, and no additional user action is required to have the electronic transmission occur; and means that the computerized device provides the receipt confirmation as the very next processing step following generation of the receipt confirmation, and that no intervening steps are present that would delay the computerized from providing the receipt confirmation, and no additional user action is required to provide the receipt confirmation.

Such exemplary methods can therefore automatically display the first scan receipt confirmation (on a graphic user interface of the receiving device) after starting execution of the second scan job, as shown in item 110. In other words, the scanner device does not delay starting execution of the second scan job while waiting for the first scan receipt confirmation (prevents any delay that would that would be based on waiting for receipt of the first scan receipt confirmation). Similarly, if the first scan job is a multi-part scan job (where the first scan receipt confirmation would include multiple first scan receipt confirmations, and each of the multiple first scan receipt confirmations would relate to an individual part of the multi-part scan job); the exemplary methods herein prevent delay of continuation of any individual part of the multi-part scan job that would be based on waiting for receipt of any of the first scan receipt confirmations, and prevent delay of starting execution of the second scan job that would be based on waiting for receipt of the first scan receipt confirmation.

Figure 2:
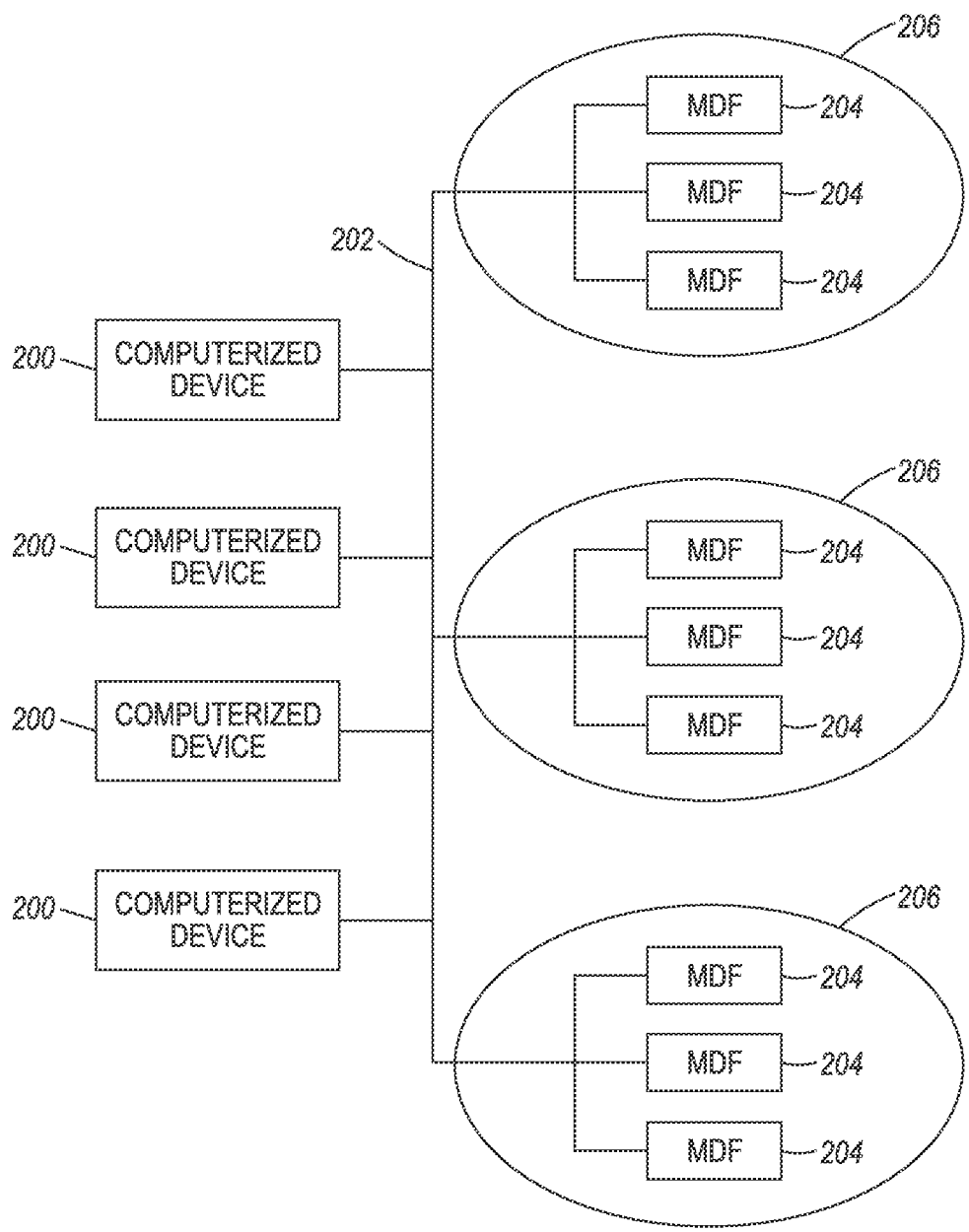
FIG. 2 is a schematic diagram illustrating systems herein.

As shown in FIG. 2, exemplary system systems and methods herein include various computerized devices 200, 204 located at various different physical locations 206. The computerized devices 200, 204 can include print servers, printing devices, personal computers, etc., and are in communication (operatively connected to one another) by way of a local or wide area (wired or wireless) network 202.

Figure 3:
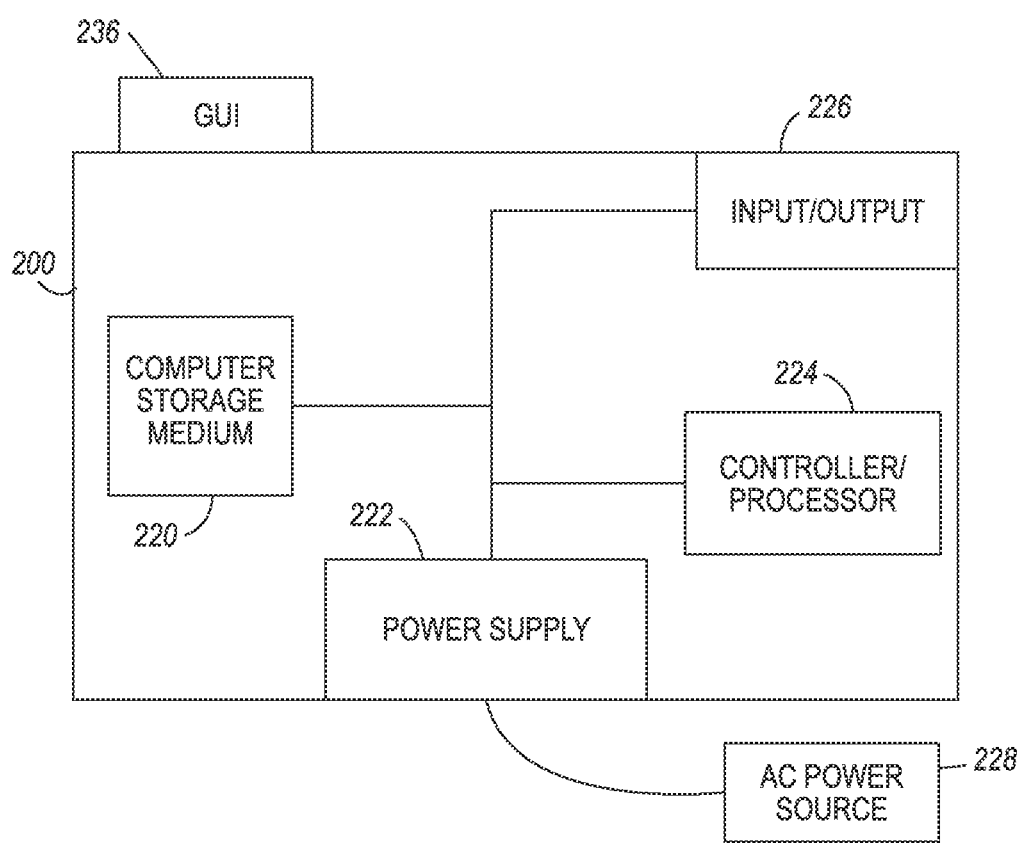
FIG. 3 is a schematic diagram illustrating devices herein.

FIG. 3 illustrates a computerized device 200, which can be used with systems and methods herein and can comprise, for example, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 3, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 4:
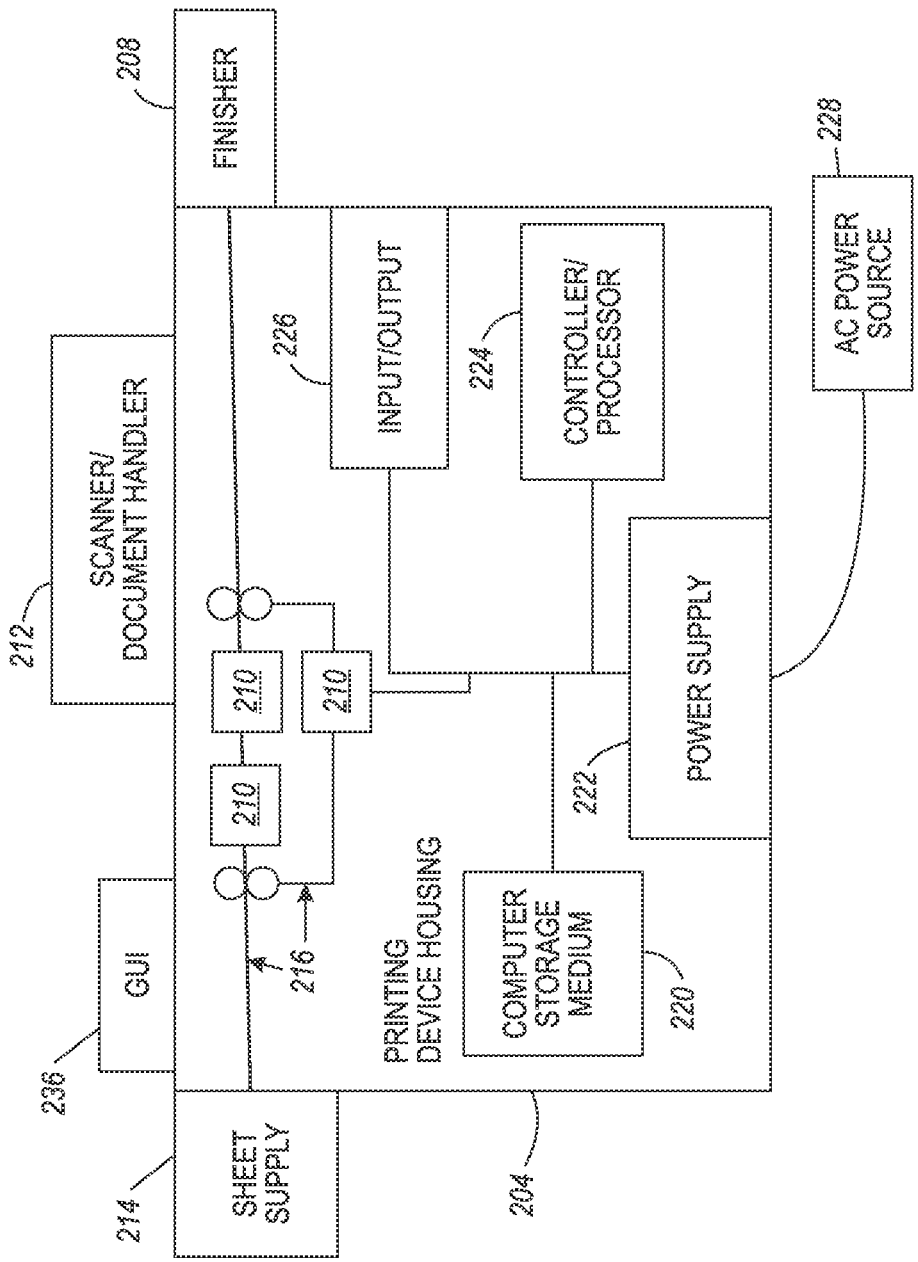
FIG. 4 is a schematic diagram illustrating devices herein.

FIG. 4 illustrates a computerized device that is a printing device 204, which can be used with systems and methods herein and can comprise, for example, a printer, copier, multi-function machine, multi-function device (MFD), etc. The printing device 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printing device 204 can include at least one accessory functional component (such as a scanner/document handler 212, etc.) that also operate on the power supplied from the external power source 228 (through the power supply 222).

Therefore, as shown in FIGS. 2-4, exemplary systems herein can include (but are not limited to) at least one scanner device 204, at least one computerized device 200 operatively connected to the scanner device 204 over a network 202, at least one receiving device 200, etc. The network 202 is operatively connected to (meaning directly or indirectly connected to) the computerized device 200 and the scanner device 204. Again, the "receiving device" referred to above can be the scanner device 204 itself and/or additional computerized device(s) 200 separate from the scanner device 204, such as a smart phone, personal computer, etc.

As noted above, such exemplary systems herein are specialized and can require the scanner device 204 to always provide immediate automatic electronic transmissions of the scan jobs to the computerized device 200 based on the scanner device 204 executing the scan jobs. Similarly, the system can require the computerized device 200 to always provide immediate automatic corresponding receipt confirmations of the scan jobs based on the computerized device 200 receiving the scan jobs. Again, by "immediate automatic" execution of processing steps, what is meant is that the very next processing step following completion of the previous processing step is performed without pause, and that no intervening steps are present that would delay the next processing step, and no additional user action is required to have the next processing step occur.

With such exemplary systems, the scanner device 204 executes a first scan job to produce a first electronic scan item, and automatically transmits the first electronic scan item to the computerized device 200. The scanner device 204 then starts execution of a second scan job after the executing of the first scan job to produce a second electronic scan item. The computerized device 200 automatically generates a first scan receipt confirmation based on the computerized device 200 receiving the first electronic scan item from the scanner device 204, and automatically transmits the first scan receipt confirmation to the receiving device over the network 202. The receiving device then automatically displays the first scan receipt confirmation on a graphic user interface of the receiving device, even after starting execution of the second scan job.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A system comprising:
a scanner device executing a first scan job to produce a first electronic scan item; and
a computerized device operatively connected to said scanner device over a network,
said network being operatively connected to said computerized device and said scanner device,
said scanner device providing immediate automatic electronic transmissions of scan jobs to said computerized device based on said scanner device executing said scan jobs,
said computerized device providing immediate automatic corresponding receipt confirmations of said scan jobs based on said computerized device receiving said scan jobs,
said scanner device automatically transmitting said first electronic scan item to said computerized device,
said scanner device starting execution of a second scan job after said executing of said first scan job to produce a second electronic scan item,
said computerized device automatically generating a first scan receipt confirmation based on said computerized device receiving said first electronic scan item from said scanner device,
said computerized device automatically transmitting said first scan receipt confirmation to said scanner device over said network after said starting execution of said second scan job; and
said scanner device automatically displaying said first scan receipt confirmation on a graphic user interface of said scanner device after said starting execution of said second scan job.

2. The system according to claim 1, said scanner device preventing delay of said starting execution of said second scan job based on waiting for receipt of said first scan receipt confirmation.

3. The system according to claim 1, said first scan job comprising a multi-part scan job, and said first scan receipt confirmation comprising multiple first scan receipt confirmations, each of said multiple first scan receipt confirmations relating to an individual part of said multi-part scan job.

4. The system according to claim 3, said scanner device preventing delay of continuation of any said individual part of said multi-part scan job based on waiting for receipt of any of said first scan receipt confirmations, and
    said scanner device preventing delay of said starting execution of said second scan job based on waiting for receipt of said first scan receipt confirmation.

5. The system according to claim 1, said execution of said second scan job and said transmitting of said first electronic scan item being performed simultaneously.

6. The system according to claim 1, said scanner device always providing immediate automatic electronic transmissions of said scan jobs to said computerized device based on said scanner device executing said scan jobs, and
    said computerized device always providing immediate automatic corresponding receipt confirmations of said scan jobs based on said computerized device receiving said scan jobs.

7. A system comprising:
    a scanner device executing a first scan job to produce a first electronic scan item;
    a computerized device operatively connected to said scanner device over a network; and
    at least one receiving device comprising said scanner device and an additional computerized device separate from said scanner device,
    said network being operatively connected to said computerized device and said scanner device,
    said scanner device providing immediate automatic electronic transmissions of scan jobs to said computerized device based on said scanner device executing said scan jobs,
    said computerized device providing immediate automatic corresponding receipt confirmations of said scan jobs based on said computerized device receiving said scan jobs,
    said scanner device automatically transmitting said first electronic scan item to said computerized device,
    said scanner device starting execution of a second scan job after said executing of said first scan job to produce a second electronic scan item,
    said computerized device automatically generating a first scan receipt confirmation based on said computerized device receiving said first electronic scan item from said scanner device,
    said computerized device automatically transmitting said first scan receipt confirmation to said at least one receiving device over said network after said starting execution of said second scan job; and
    said at least one receiving device automatically displaying said first scan receipt confirmation on a graphic user interface of said at least one receiving device after said starting execution of said second scan job.

8. The system according to claim 7, said scanner device preventing delay of said starting execution of said second scan job based on waiting for receipt of said first scan receipt confirmation.

9. The system according to claim 7, said first scan job comprising a multi-part scan job, and said first scan receipt confirmation comprising multiple first scan receipt confirmations, each of said multiple first scan receipt confirmations relating to an individual part of said multi-part scan job.

10. The system according to claim 9, said scanner device preventing delay of continuation of any said individual part of said multi-part scan job based on waiting for receipt of any of said first scan receipt confirmations, and
    said scanner device preventing delay of said starting execution of said second scan job based on waiting for receipt of said first scan receipt confirmation.

11. The system according to claim 7, said execution of said second scan job and said transmitting of said first electronic scan item being performed simultaneously.

12. The system according to claim 7, said scanner device always providing immediate automatic electronic transmissions of said scan jobs to said computerized device based on said scanner device executing said scan jobs, and
    said computerized device always providing immediate automatic corresponding receipt confirmations of said scan jobs based on said computerized device receiving said scan jobs.

13. A method comprising:
    executing a first scan job using a scanner device to produce a first electronic scan item;
    automatically transmitting said first electronic scan item from said scanner device to a computerized device over a network operatively connected to said computerized device and said scanner device, said scanner device providing immediate automatic electronic transmissions of scan jobs to said computerized device based on said scanner device executing said scan jobs, and said computerized device providing immediate automatic corresponding receipt confirmations of said scan jobs based on said computerized device receiving said scan jobs;
    starting execution of a second scan job immediately after said executing of said first scan job using said scanner device to produce a second electronic scan item;
    automatically generating a first scan receipt confirmation by said computerized device based on said computerized device receiving said first electronic scan item from said scanner device;
    automatically transmitting said first scan receipt confirmation from said computerized device to said scanner device over said network after said starting execution of said second scan job; and
    automatically displaying said first scan receipt confirmation on a graphic user interface of said scanner device after said starting execution of said second scan job.

14. The method according to claim 13, said scanner device preventing delay of said starting execution of said second scan job based on waiting for receipt of said first scan receipt confirmation.

15. The method according to claim 13, said first scan job comprising a multi-part scan job, and said first scan receipt confirmation comprising multiple first scan receipt confirmations, each of said multiple first scan receipt confirmations relating to an individual part of said multi-part scan job.

16. The method according to claim 15, said scanner device preventing delay of continuation of any said individual part of said multi-part scan job based on waiting for receipt of any of said first scan receipt confirmations, and
    said scanner device preventing delay of said starting execution of said second scan job based on waiting for receipt of said first scan receipt confirmation.

17. The method according to claim 13, said execution of said second scan job and said transmitting of said first electronic scan item being performed simultaneously.

18. The method according to claim 13, said scanner device and said computerized device comprising elements of a system, said system requiring said scanner device to always provide immediate automatic electronic transmissions of said scan jobs to said computerized device based on said scanner device executing said scan jobs, and said system requiring said computerized device to always provide immediate automatic corresponding receipt confirmations of said scan jobs based on said computerized device receiving said scan jobs.

19. A method comprising:

executing a first scan job using a scanner device to produce a first electronic scan item;

automatically transmitting said first electronic scan item from said scanner device to a computerized device over a network operatively connected to said computerized device and said scanner device, said scanner device providing immediate automatic electronic transmissions of scan jobs to said computerized device based on said scanner device executing said scan jobs, and said computerized device providing immediate automatic corresponding receipt confirmations of said scan jobs based on said computerized device receiving said scan jobs;

starting execution of a second scan job immediately after said executing of said first scan job using said scanner device to produce a second electronic scan item;

automatically generating a first scan receipt confirmation by said computerized device based on said computerized device receiving said first electronic scan item from said scanner device;

automatically transmitting said first scan receipt confirmation from said computerized device to at least one receiving device over said network after said starting execution of said second scan job, said at least one receiving device comprising said scanner device and an additional computerized device separate from said scanner device; and automatically displaying said first scan receipt confirmation on a graphic user interface of said at least one receiving device after said starting execution of said second scan job.

20. The method according to claim 19, said scanner device preventing delay of said starting execution of said second scan job based on waiting for receipt of said first scan receipt confirmation.

21. The method according to claim 19, said first scan job comprising a multi-part scan job, and said first scan receipt confirmation comprising multiple first scan receipt confirmations, each of said multiple first scan receipt confirmations relating to an individual part of said multi-part scan job.

22. The method according to claim 21, said scanner device preventing delay of continuation of any said individual part of said multi-part scan job based on waiting for receipt of any of said first scan receipt confirmations, and said scanner device preventing delay of said starting execution of said second scan job based on waiting for receipt of said first scan receipt confirmation.

23. The method according to claim 19, said execution of said second scan job and said transmitting of said first electronic scan item being performed simultaneously.

24. The method according to claim 19, said scanner device and said computerized device comprising elements of a system, said system requiring said scanner device to always provide immediate automatic electronic transmissions of said scan jobs to said computerized device based on said scanner device executing said scan jobs, and said system requiring said computerized device to always provide immediate automatic corresponding receipt confirmations of said scan jobs based on said computerized device receiving said scan jobs.

\* \* \* \* \*